(12) United States Patent
Wu et al.

(10) Patent No.: US 7,957,630 B2
(45) Date of Patent: Jun. 7, 2011

(54) MOBILE VIDEO/AUDIO DEVICE

(75) Inventors: Jung-Chang Wu, Taipei (TW); Wei-Yu Wu, Taipei (TW)

(73) Assignee: Sysgration Ltd., Taipei (TW)

( * ) Notice: Subject to any disclaimer, the term of this patent is extended or adjusted under 35 U.S.C. 154(b) by 1212 days.

(21) Appl. No.: 11/609,097

(22) Filed: Dec. 11, 2006

(65) Prior Publication Data

US 2008/0138039 A1 Jun. 12, 2008

(51) Int. Cl.
*H04N 5/77* (2006.01)
(52) U.S. Cl. ........................................ 386/362; 386/361
(58) Field of Classification Search .................... 386/96, 386/124, 125, 46, 45, 104, 200, 219, 230, 386/231, 359, 362
See application file for complete search history.

(56) References Cited

U.S. PATENT DOCUMENTS 7,805,050 B2 * 9/2010 Lavelle et al. ................ 386/241
* cited by examiner

*Primary Examiner* — Robert Chevalier
(74) *Attorney, Agent, or Firm* — Lowe Hauptman Ham & Berner, LLP

(57) ABSTRACT

A mobile video/audio device is provided, comprising a receiving box, a display mounted on a surface of the receiving box for displaying a video content with a corresponding audio content accompanied, a compact disk (CD) drive disposed within the receiving box with an access side thereof exposed and having an eject button formed at a side thereof, a control module comprising a video/audio playing circuit formed in modules for controlling the display, CD drive and other units associated with the video/audio playing circuit, the control module being further disposed within the receiving box and detachable therefrom; and a control panel disposed at a location outside the display within the receiving box and having a plurality of control keys for controlling the control module to play the video/audio content and a plurality of video/audio out/input ports for connecting with an external device.

5 Claims, 3 Drawing Sheets

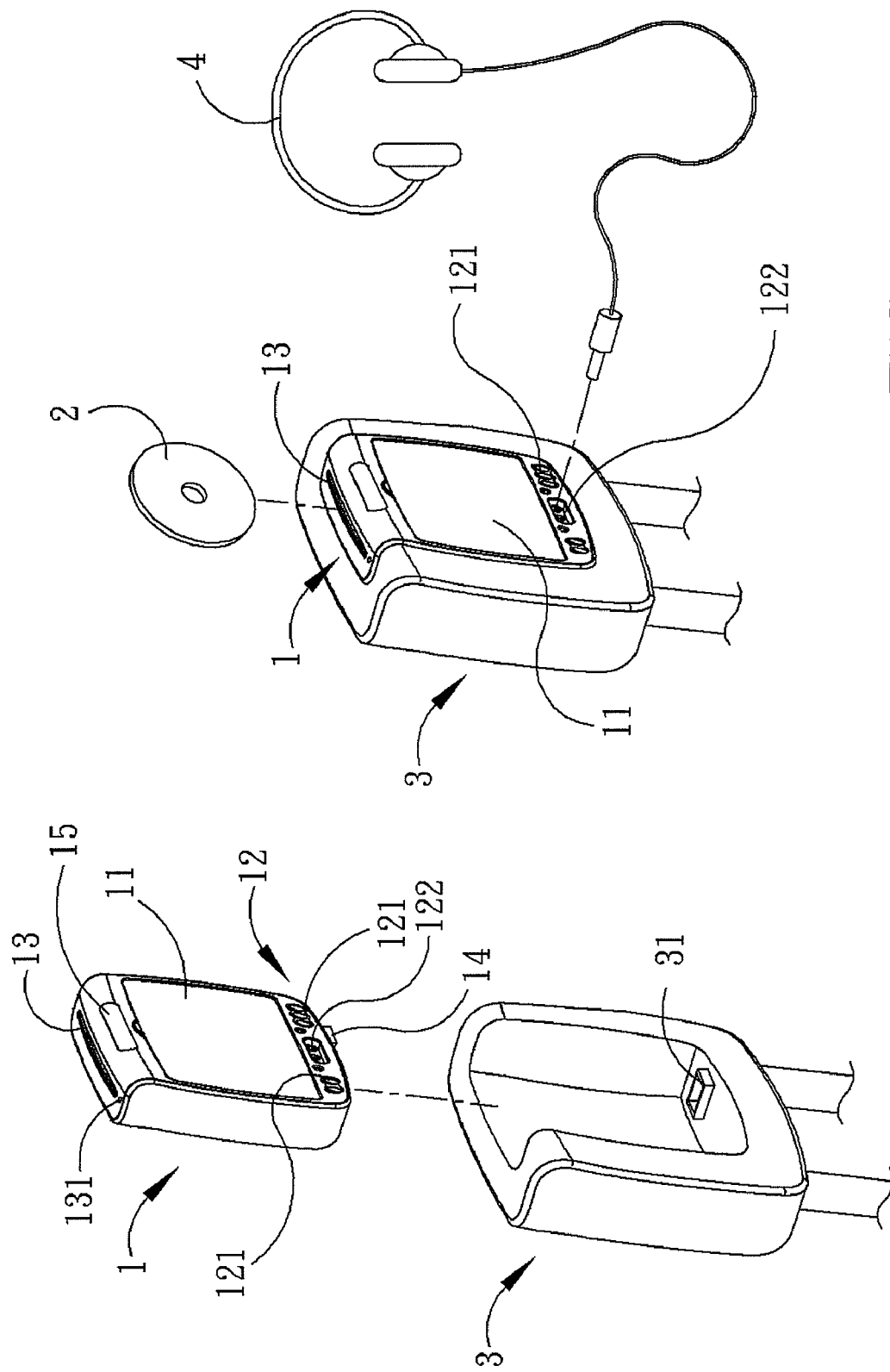

MOBILE VIDEO/AUDIO DEVICE

BACKGROUND OF THE INVENTION

1. Field of the Invention

The present invention relates to a mobile video/audio device and particularly to a mobile video/audio device which can be achieved with a reduced physical dimensions and weight, good portability, and easy production and maintenance.

2. Description of the Prior Art

Video and audio entertainment has become part of human daily life in the current time. Particularly, when staying on a bus or vehicle in a trip, passengers would generally like to have some entertainment. Although some would read books to spare time, reading in the environment on the bus or vehicle is not pleasant to the passengers owing to the dim light and vibrated vehicle body. If there is some video and audio information provided on the bus or vehicle, the passengers could be considerably entertained and spare time without too much negative feeling.

For the current bus or vehicle used video/audio devices, they are typically disposed on headrests of seats. Further, they generally have complex structures and circuits and are required to be installed in a spatial layout prior to the car or vehicle production. Moreover, they are not only large in volume and heavy in weight but also difficult to be subject to maintenance and replacement. Meanwhile, the video/audio information and power required for the bus or vehicle used video/audio device is typically controlled at the driver's place, making the passengers difficult to acquire freely the video/audio information they want. In addition, the bus or vehicle used video/audio device is costly.

In view of the above demerits, the inventor of the present invention envisages that the conventional mobile video/audio device can be provided in several modules so that installation and maintenance thereof can be simplified. Meanwhile, the video/audio device can be provided in a reduced dimension or volume so that it can be facilitated in detachment and mobility. In addition, the mobile video/audio device can be installed at a location other than a fixed position and have a reduced cost.

SUMMARY OF THE INVENTION

It is, therefore, an object of the present invention to provide a mobile video/audio device, which is configured as several modules, thereby achieving the efficacies of efficient space arrangement, ultra thin and light device body, and good portability and easy detachment.

It is another object of the present invention to provide a mobile video/audio device, which is light in body, easy to be replaced, installed and detached.

It is yet another object of the present invention to provide a mobile video/audio device which may be installed on various kinds of space other than a bus or vehicle and different positions in a space, thereby reducing a manufacturing and installment cost.

In accordance with the present invention, the mobile video/audio device, comprising a receiving box, a display mounted on a surface of the receiving box for displaying a video content with a corresponding audio content accompanied, a compact disk (CD) drive disposed within the receiving box with an access side thereof exposed and having an eject button formed at a side thereof, a control module comprising a video/audio playing circuit formed in modules for controlling the display, CD drive and other units associated with the video/audio playing circuit, the control module being further disposed within the receiving box and detachable therefrom; and a control panel disposed at a location outside the display within the receiving box and having a plurality of control keys for controlling the control module to play the video/audio content and a plurality of video/audio out/input ports for connecting with an external device.

The mobile video/audio device according to the present invention has a reduced physical dimension and weight and an efficient arrangement, and is relatively easier to be assembled, detached, and maintained or replaced.

BRIEF DESCRIPTION OF THE DRAWINGS

The drawings disclose an illustrative embodiment of the present invention which serves to exemplify the various advantages and objects hereof, and are as follows:

FIG. 1 is a perspective view of a mobile video/audio device according to the present invention;

FIG. 2 is a schematic view of use of the mobile video/audio device according to the present invention;

DETAILED DESCRIPTION OF THE PREFERRED EMBODIMENT

Figure 3:
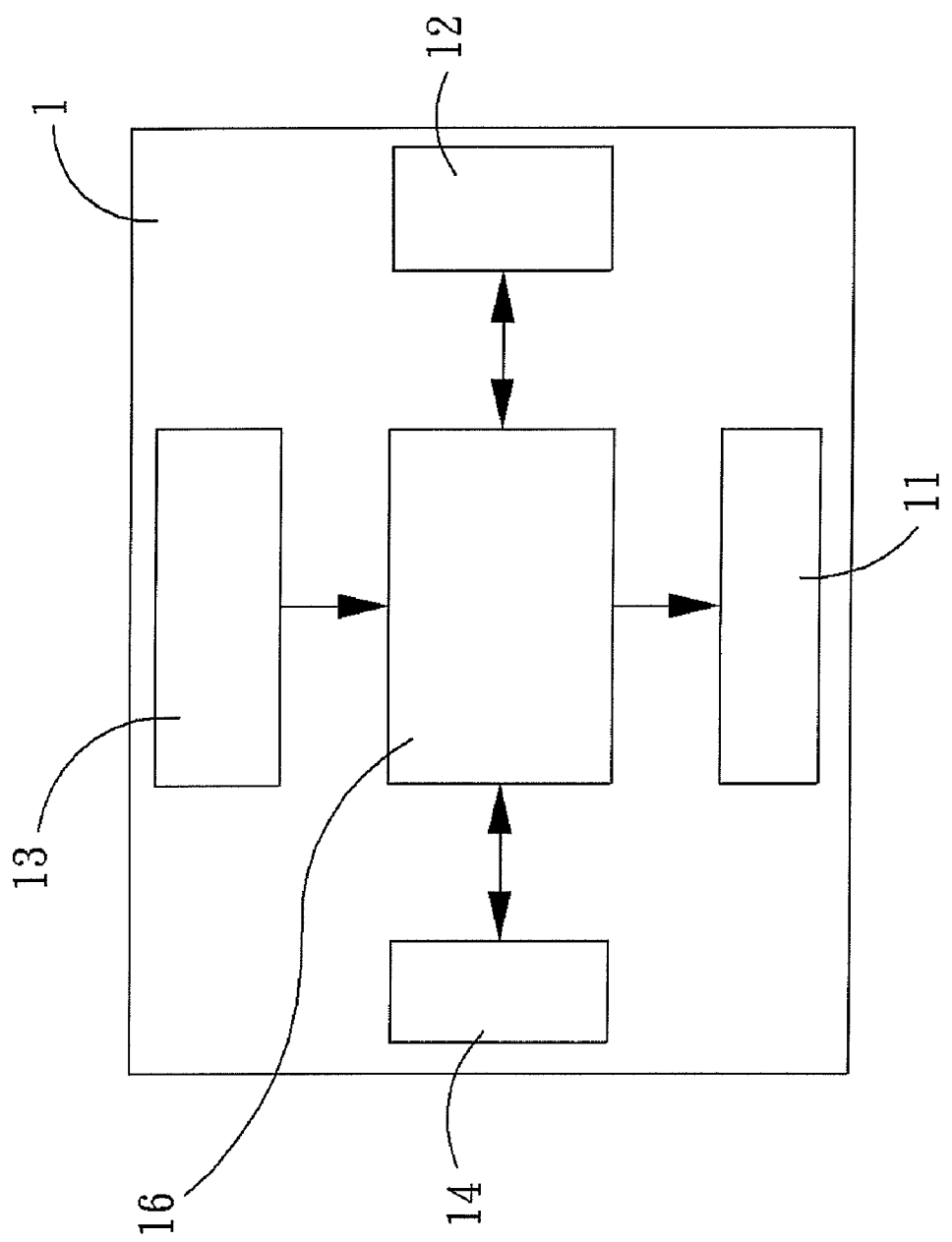
FIG. 3 is a structural block diagram of the mobile video/audio device according to the present invention.
Figure 5:
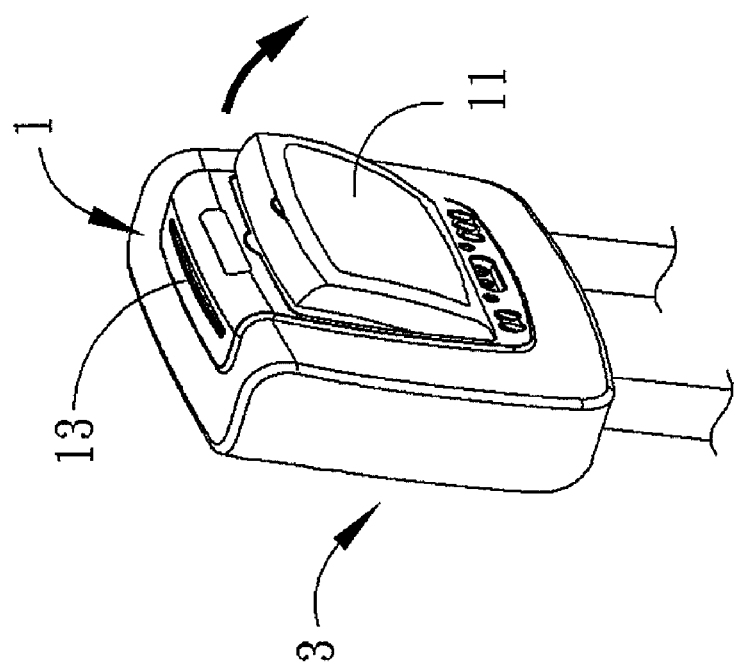
FIG. 5 is a schematic diagram showing a display of the mobile video/audio device is pulled outwards according to the present invention.

Referring to FIG. 1 and FIG. 2, a mobile video/audio device according to the present invention is depicted therein. The mobile video/audio device comprises a receiving box 1, a display 11, a control panel 12 and a CD (compact disk) drive 13. Within the receiving box 1, units associated with video/audio playing are received so that any video/audio content of a CD may be played. The receiving box 1 is mounted on a headrest 3 of a seat in a bus or vehicle and has the display 11 disposed on a surface thereof. On the display 11, a passenger in rear of the seat may watch the played video/audio content. The control panel 12 is disposed on a surface of the receiving box 1 and comprises a plurality of keys 121 through which powering on, playing, adjusting, CD ejecting functions and the like can be accessed. The control panel 12 further comprises a plurality of video/audio output/input ports 122 for connection of the mobile video/audio device with other external devices, such as an earphone 4 and speakers, etc.

The CD drive 13 is disposed at a side on the receiving box 1 and has an access side exposed on the headrest 3. The CD drive 13 is an embedded CD drive so that space therefor can be saved. On a side of the CD drive 13, a CD eject button 131 is provided, through which a CD 2 may be conveniently inserted into the CD drive 13. In the case where the CD eject button 131 is not provided or allowed to be used, the CD ejecting function can be performed by pressing a button on 121.

Referring to FIG. 3, a control module 16 is further disposed within the receiving box 1. The control module 16 is provided in integration with video/audio playing circuits and formed in several modules. The control module 16 is connected with the display 11, the control panel 12, the CD drive 13 and other units associated with the mobile video/audio device. A user may access the mobile video/audio device by dictating the control module 16 through the control panel 12. By means of the control module 16 as well as the video/audio playing circuits integrated therewith, the mobile video/audio device can have a reduced physical dimension and weight. Accordingly, the mobile video/audio device can be an ultra-thin device. Further, the mobile video/audio device is relatively easier to be detached, and maintained or replaced. In addition, the components in the mobile video/audio device can be efficiently arranged.

On the receiving box 1, a first connection port 14 or other external cables are provided. In addition, a second connection port 31 is provided as a pair with the connection port 14 for connection with a power and speakers used for the bus or vehicle. The connection of this pair of connection ports 14, 31 with the power and speakers does not impair the visual effect of the mobile video/audio device. Meanwhile, the pair of connection ports can be provided at any household space other than the bus and vehicle, so that the mobile video/audio device can be installed at any suitable place.

Referring to FIG. 3, an infrared receiving device 15 is disposed on the receiving box 1 and which may be a bluetooth-based device and the like. A remote control may also be at the same time provided, so that a wireless access to the mobile video/audio device can be possible.

Figure 4:
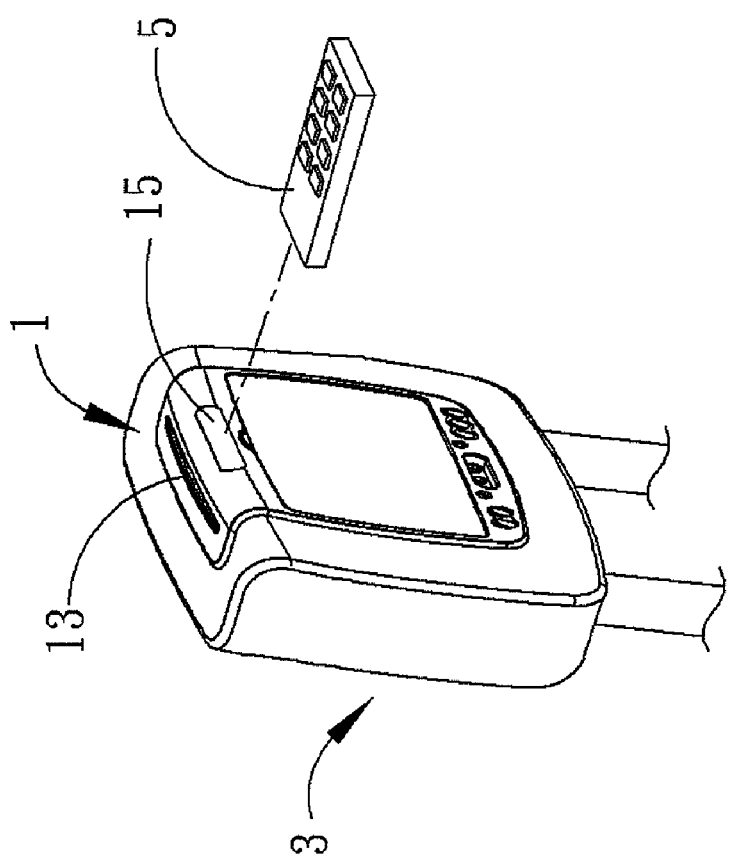
FIG. 4 is a schematic diagram showing a remote controller is used to dictate the mobile video/audio device according to the present invention.

Referring to FIG. 4, a rotation shaft (not shown) is disposed between the display 11 and the receiving box 1. The rotation axis may be pushed outwards according to the line of sight of the user in rear of the seat having the mobile video/audio device mounted thereon, so as to acquire the optimal viewing angle with respect to the display of the mobile video/audio device.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A mobile video/audio device, comprising:
    a headset having an internal region and a first connection port disposed in the internal region;
    a receiving box having a second connection port for connecting the first connection port, wherein the receiving box is disposed in the internal region of the headset;
    a display mounted on a surface of the receiving box for displaying a video content with a corresponding audio content accompanied;
    a compact disk (CD) drive disposed within the receiving box with an access side thereof exposed and having an eject button formed at a side thereof;
    a control module comprising a video/audio playing circuit formed in modules for controlling the display, CD drive and other units associated with the video/audio playing circuit, the control module being further disposed within the receiving box and detachable therefrom; and
    a control panel disposed at a location outside the display within the receiving box and having a plurality of control keys for controlling the control module to play the video/audio content and a plurality of video/audio out/input ports for connecting with an external device.

2. The mobile video/audio device as claimed in claim 1, wherein the receiving box is portable and allowed to be connected with a connection port of the external device.

3. The mobile video/audio device as claimed in claim 1, wherein the receiving box has an infrared receiving device and a remote control for transmitting an infrared signal to the infrared receiving device to access the mobile video/audio device.

4. The mobile video/audio device as claimed in claim 1, wherein the CD drive is an embedded CD drive.

5. The mobile video/audio device as claimed in claim 1, wherein a rotation shaft is disposed between the receiving and the display so that the display is allowed to be pulled outwards.

* * * * *